US006881001B1

(12) United States Patent
McCamy

(10) Patent No.: US 6,881,001 B1
(45) Date of Patent: Apr. 19, 2005

(54) METHOD AND MACHINE FOR LOOSENING ARTIFICIAL TURF INFILLS

(76) Inventor: Thomas H. McCamy, 131 Huntington Rd., Dalton, GA (US) 30720

( * ) Notice: Subject to any disclaimer, the term of this patent is extended or adjusted under 35 U.S.C. 154(b) by 0 days.

(21) Appl. No.: 10/419,859

(22) Filed: Apr. 22, 2003

Related U.S. Application Data
(60) Provisional application No. 60/374,134, filed on Apr. 22, 2002.

(51) Int. Cl.[7] .................. A46B 11/00; B05C 17/00; A01B 21/02; A01B 29/00
(52) U.S. Cl. .................. 401/208; 492/30; 172/540; 401/28
(58) Field of Search .................. 401/28, 203, 220; 132/112, 113, 114, 115, 116; 492/30, 31, 32, 33, 34, 35, 36, 37; 172/21, 22, 523, 540

(56) References Cited

U.S. PATENT DOCUMENTS

| 2,802,604 | A | * | 8/1957 | Ebberts | 222/207 |
| 5,902,414 | A | * | 5/1999 | Keal et al. | 134/37 |
| 5,958,527 | A | * | 9/1999 | Prevost | 428/17 |

* cited by examiner

Primary Examiner—David J. Walczak
(74) Attorney, Agent, or Firm—Dorsey & Whitney LLP

(57) ABSTRACT

Devices and methods for softening the infill layer of artificial turf. Multiple prongs extend from a rake or a rotating drum or wheel that is pushed or pulled across the artificial turf. In one embodiment, the prongs eject pressurized gas or liquid into the base of the infill. In another embodiment, the prongs vibrate within the base of the infill. Ideally, both methods are employed. The forced gas and/and or fluid, and the vibration, serve to loosen the rubber and sand particulate that make up the infill and thereby soften the artificial field.

9 Claims, 1 Drawing Sheet

METHOD AND MACHINE FOR LOOSENING ARTIFICIAL TURF INFILLS

CROSS REFERENCE TO RELATED APPLICATIONS

This application claims priority of Provisional Application No. 60/374,134, filed Apr. 22, 2002, the subject matter of which is herein incorporated by reference in its entirety

TECHNICAL FIELD

The invention is directed to a machines and methods for loosening artificial turf. More specifically, this invention is directed to machines and methods for loosening rubber and/or sand particles commonly used at the base of artificial turf so that the turf exhibits a g-max rating below 130.

BACKGROUND

The type of artificial turf made for sports has changed drastically over the last five years. The old brush type turf was glued to a shock pad that, in turn, was glued to an asphalt or concrete base. The new type of turf is installed over a packed base of crushed limestone, granite dust, crushed rocks, or stabilized soil. The turf face is then infilled with a recycled ground rubber, virgin rubber, sand or a combination of particles to hold the turf in place. The infilled particles act as a ballast and add cushion at the same time. These types of products do not need to be glued down.

However, rain has a tendency to wash away the rubber particles in the infill. This is especially true if the field is installed with a grade that peaks in the center of the field. When the particles wash away, the particulate cushion is depleted and less uniform. Eventually, the field becomes hard and inconsistent. Even the best particulate infills erode and/or compact over time. Rain and frequent use not only wash the particles away, but also press the remaining particles together, making the field harder. Eventually the field becomes so hard that it must be replaced.

The standard for measuring the hardness (impact resistance) of artificial turf is astm f 355 ("the g-max test"). The harder the field, the higher the g-max value. According to the U.S. Consumer Product Safety Commission, an artificial field should not exceed a g-max value of 200. However, the potential for injury is substantially increased with each rise in g-max value. In general, a g-max of 130 or below is considered safe. A rating from 130 to 200 is suspect and a rating over 200 is considered too hard and unsafe for football playing surfaces.

For example, according to Southwest Recreational Industries, two synthetic football fields were installed by Field Turf Holdings, Inc. in 1999. These fields exhibited g-max values as high as 181 and 175, respectively, after only 13 months of use. Furthermore, these g-max values were obtained after and attempt to de-compact the fields. These values are very high and illustrate the problem one faces with particulate infills.

Accordingly, there is a need for machines that softens particulate infills and methods for softening particulate infills.

SUMMARY OF THE INVENTION

The invention is directed to various machines and methods for improving the g-max rating of artificial turf. A g-max below 130 is considered safe. A rating from 130 to 200 is suspect and a rating over 200 is considered too hard and unsafe for football playing surfaces. The invention rejuvenates fields where the g-max is too high. In addition, the method and machine reduce the ASTM-F-1292-96 value of a field. An ASTM-F-1292-96 value under 1,000 is considered safe.

The machines are analogous to a lawn aerator, at least to the extent that the machines contain prongs extending from a wheel or drum or rake that penetrate and loosen the infill as the machines are pushed or pulled across the field. However, unlike conventional lawn aerators, each prong injects gas and/or fluid into the base of the infill, and/or vibrates within the infill, thereby further loosening the infill layer.

According to the invention, one method for loosening infill in artificial turf comprises the following steps:

(i) penetrating the infill layer multiple times with one or more hollow prongs; and (ii) injecting gas and/or fluid into the base of the infill layer through the one or more hollow prongs.

Another method comprises the following steps:

(i) penetrating the infill layer multiple times with one or more prongs; and (ii) vibrating the one or more prongs within the infill.

Preferably, these two methods are used in combination.

DETAILED DESCRIPTION

Figure 1:
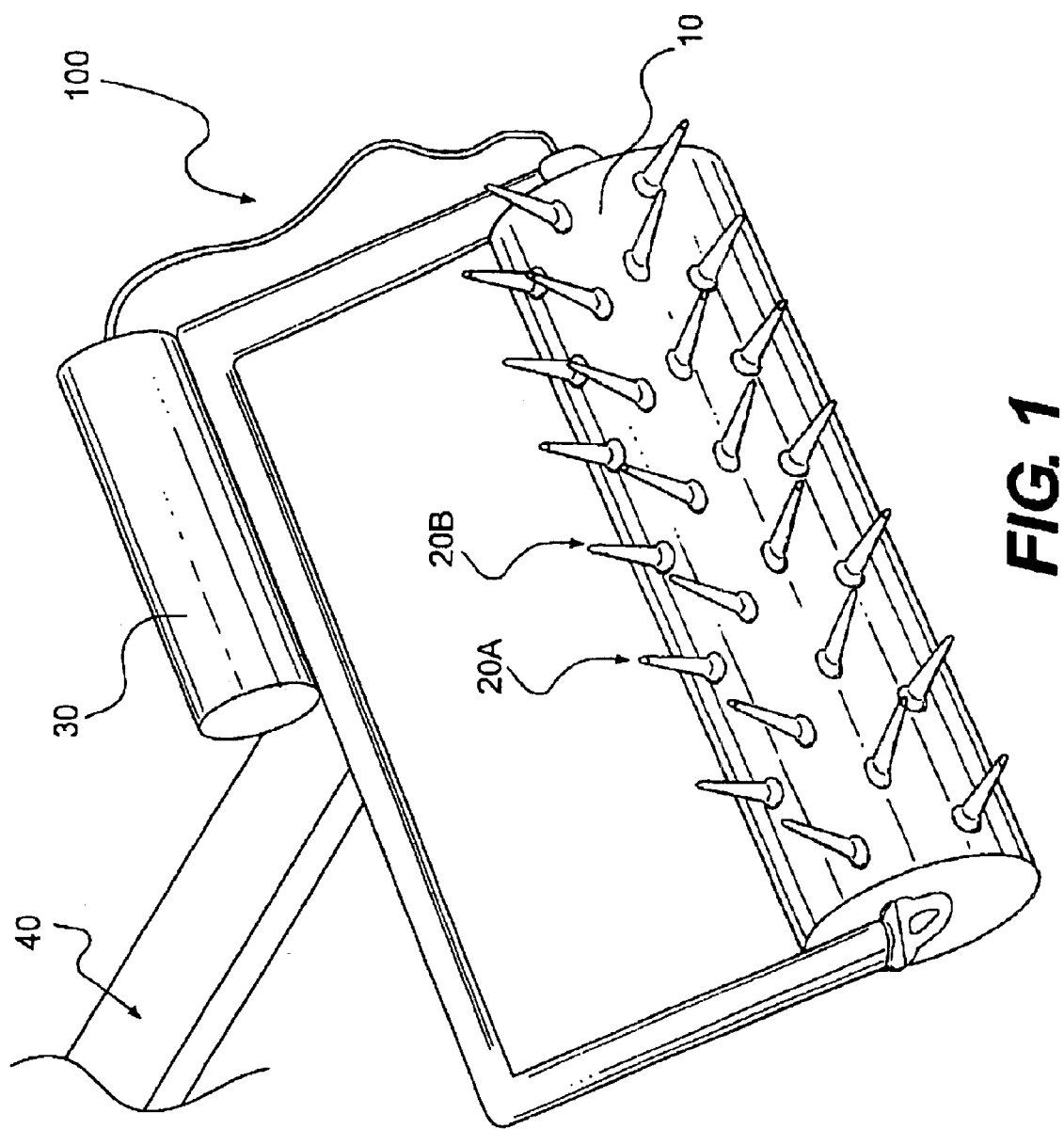
FIG. 1 illustrates one embodiment of the instant invention.

The invention is directed to machines designed to rejuvenate the new infilled type of artificial turf. Basically, the machines are aerators adapted so that they also inject gas or water into the base of the infill layer, or vibrate one or more prongs within the infill layer, thereby providing pressure below the compacted particles that lifts the compacted particles.

The machines can be manufactured in a number of ways and can be designed to push drag, or automatically roll over artificial turf. In addition, the machines can be manufactured in a number of sizes, i.e., 12–20 feet wide or as small as one inch. Smaller sizes are more convenient for personal lawn care, larger sizes more convenient for industrial treatment. Similarly, the machines can be designed to process artificial turf at varying rates, so that anywhere from a small area to as much as 40,000 square feet or more can be processed in one hour.

However, the machines are made, they function by forcing infilled particles to move from the base of the tufts at the primary back to the ends of the turf tips. The tips could be as low as ½ inch to as high as 5 inches.

The machines do not work like a brush, vacuum, rake vibrator, or other known types of machines. The machines addresses the problem of high g-max caused by packed infill particles. Rain, water, high traffic footing, sun, and heat all make the particulate settle and pack down hard. Until now, there has been no known way of alleviating this problem.

The machines use a simple technique. Instant gas or fluid, or a combination thereof, is inserted through prongs into the base of the artificial turf underneath the compacted particles at a psi sufficient to lift the particles up and away from the dense compacted base. Preferably, the pressurized gas is air and the fluid is water.

Alternatively, prongs vibrate to loosen the particulate layer. Preferably, the vibration is ultrasonic.

Most preferably, a combination of both techniques is used. When vibration is used in combination with forced gas and/or fluid, the vibrating prongs are preferably separate from the prongs injecting the forced gas and/or fluid. In addition, other prongs may be present that do not inject gas and/or fluid and do not vibrate but simply churn the field by continually piercing the infill layer. These prongs may be hollow or solid.

In this manner, the hard particulate layer is fluffed into a soft layer similar in g-max value to a new installation. The action of the air going through the prongs plus the vibration loosens the particles and restores the artificial turf to its original g-max rating.

FIG. 1 is illustrative of one embodiment of the invention. In FIG. 1, the device 100 has a rotating drum 10, prongs 20A and 20B and source 30. Prongs 20A inject pressurized gas and/or fluid from drum 10 into the base of the artificial turf. The pressurized gas and/or fluid is supplied to drum 10 by source 30. Prongs 20B provide ultrasonic vibration to the base of the artificial turf. The drum is pushed or pulled across the artificial turf by handle 40, either manually or by way of a tractor or other powered device.

The invention also pertains to methods for loosening infill in artificial turf. One such method comprises the following steps:

(i) penetrating the infill layer multiple times with one or more hollow prongs; and (ii) injecting gas and/or fluid into the base of the infill layer through the one or more hollow prongs.

Another such method comprises the following steps:

(i) penetrating the infill layer multiple times with one or more prongs; and (ii) vibrating the one or more prongs within the infill layer.

Ideally, these two methods are used in combination.

Preferably multiple prongs are present. Preferably, the pressurized gas is air and the pressurized fluid is water. Preferably, the vibration is ultrasonic.

The prongs may be part of a machine as described above. In other words, the prongs may be attached to a wheel or roller or rake which is transported across the surface of the field. In this manner, the prongs are repeatedly inserted and removed as the device crosses the field and, each time, apply pressure and/or vibration to the base of the infill.

Although preferred embodiments of the invention and their advantages have been described herein, it should be understood that various changes, substitutions and alterations may be made without departing from the spirit and scope of the invention as defined by the appended claims and their equivalents.

What is claimed is:

1. A method for loosening infill in artificial turf comprising the following steps:

(i) penetrating the infill layer multiple times with one or more hollow prongs; and (ii) injecting gas and/or fluid into the base of the infill layer through the one or more hollow prongs.

2. The method of claim 1 wherein gas is injected.

3. The method of claim 1 wherein the gas is air.

4. The method of claim 1 wherein fluid is injected.

5. The method of claim 1 wherein the fluid is water.

6. The method of claim 1 wherein multiple prongs exist that are attached to a rotating wheel or drum.

7. The method of claim 1 wherein additional prongs are present that do not inject gas and/or fluid and may be hollow or solid.

8. A method for loosening infill in artificial turf by penetrating the infill layer multiple times with one or more prongs attached to a rotating drum pushed or pulled across the artificial turf by way of a tractor or other powered device.

9. A device for loosening infill in artificial turf comprising:

a supply of pressurized gas and/or fluid;

a rotating wheel or drum;

a tractor or other powered device for pushing or pulling the wheel or drum across artificial turf; and at least one hollow prong projecting from the rotating wheel or drum that is connected to the supply of pressurized gas and/or fluid, through which the gas and/or fluid may be ejected.

* * * * *